United States Patent [19]

Heckmann

[11] Patent Number: 4,615,867
[45] Date of Patent: Oct. 7, 1986

[54] APPARATUS FOR COOKING, DEHYDRATION AND STERILIZATION-DRYING OF ORGANIC WASTES

[75] Inventor: Emile A. Heckmann, Strasbourg, France

[73] Assignee: K. Systeme S.A.R.L., Pont Saint Marie, France

[21] Appl. No.: 604,601

[22] Filed: Apr. 27, 1984

[30] Foreign Application Priority Data

May 2, 1983 [FR] France .................. 83 07392

[51] Int. Cl.[4] .............................. F26B 3/06
[52] U.S. Cl. .................. 422/109; 422/287; 422/289; 34/86; 126/21 A; 99/331; 432/58; 432/139; 432/179; 432/186; 432/199
[58] Field of Search ............ 422/109, 286, 287, 289; 34/86; 432/58, 120, 139, 179, 186, 188, 199; 126/21 A; 99/331, 447

[56] References Cited

U.S. PATENT DOCUMENTS

| | | |
|---|---|---|
| 1,421,283 | 6/1922 | Meakin . |
| 2,202,245 | 5/1940 | Cramp ........................... 432/139 |
| 2,763,478 | 9/1956 | Parry ............................. 432/58 |
| 3,226,841 | 1/1966 | Mark .............................. 432/58 |
| 3,977,947 | 8/1976 | Pyle ............................... 432/58 |
| 4,099,338 | 7/1978 | Mullin et al. .................. 34/86 |
| 4,111,158 | 9/1978 | Reh et al. ...................... 432/58 |
| 4,402,665 | 9/1983 | Korenberg ..................... 432/58 |
| 4,455,285 | 6/1984 | Watkins et al. ................ 432/188 |

FOREIGN PATENT DOCUMENTS

| | | | |
|---|---|---|---|
| 1210666 | 2/1966 | Fed. Rep. of Germany . | |
| 2853031 | 6/1980 | Fed. Rep. of Germany | 432/58 |
| 486799 | 5/1918 | France . | |
| 919072 | 2/1947 | France . | |
| 1338906 | 8/1963 | France . | |
| 1572753 | 6/1969 | France . | |
| 2302751 | 10/1976 | France . | |
| 2403748 | 4/1979 | France . | |
| 247437 | 2/1926 | United Kingdom . | |
| 2084482 | 4/1982 | United Kingdom | 432/58 |
| 292054 | 11/1971 | U.S.S.R. | 432/58 |
| 548638 | 3/1977 | U.S.S.R. | 432/58 |

Primary Examiner—David L. Lacey
Attorney, Agent, or Firm—Young & Thompson

[57] ABSTRACT

Apparatus for cooking-dehydration and sterilization-drying of organic wastes, comprises a chamber (1) heated by a double walled enclosure (2) that communicates with fire tubes (3), the enclosure (2) receiving hot gases from a firebox (4). The hot gases pass through conduits (5) to diffusion nozzles (6) immersed in the products (7) to be dried. Some of the combustion gases are recycled by a ventilator (8) via a conduit (9) and a cyclone (10) to the firebox (4). The ventilator (8) draws in fresh air through a preheating heat exchanger (11) that is heated by the combustion gases which are then vented.

7 Claims, 4 Drawing Figures

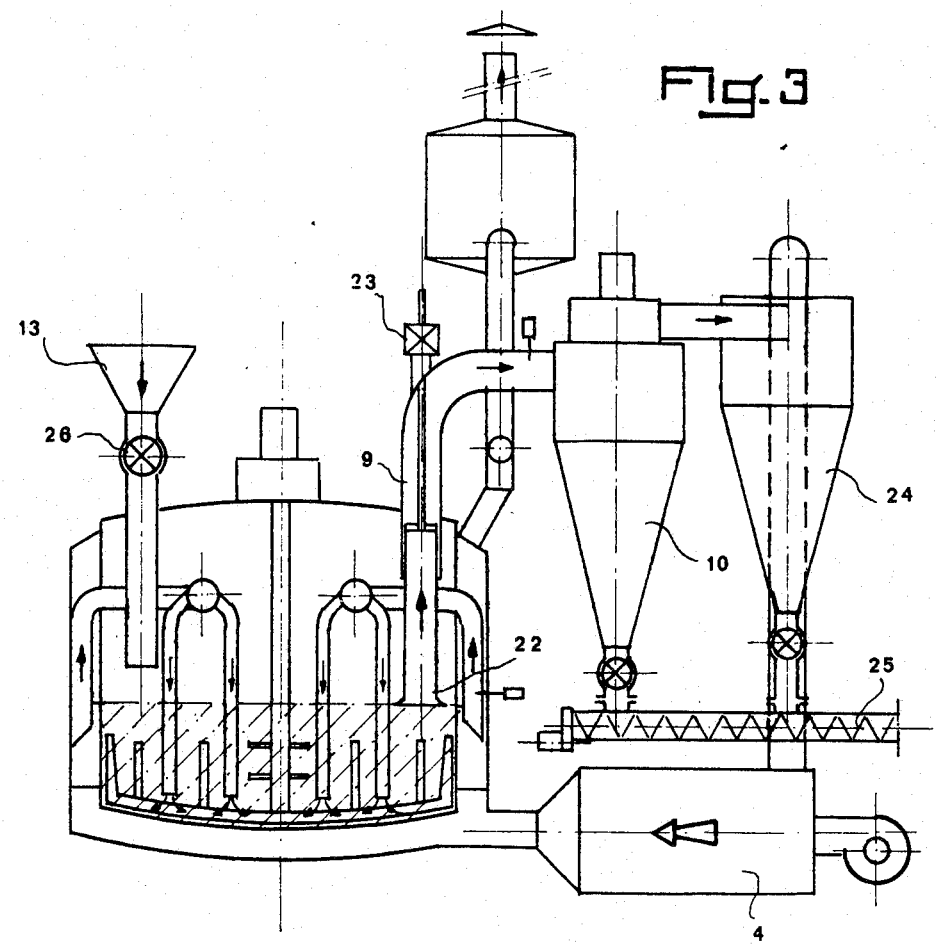
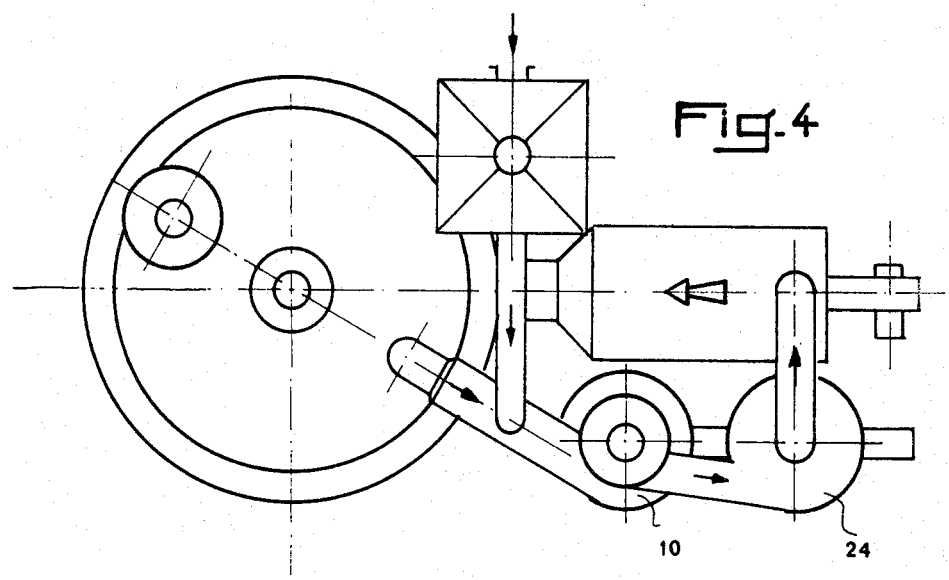

APPARATUS FOR COOKING, DEHYDRATION AND STERILIZATION-DRYING OF ORGANIC WASTES

The present invention relates to the field of economic recovery of wastes, especially in agro-feed industries, particularly slaughterhouse wastes or organic-based constituents of aqueous or liquid products, so as to preserve the chemico-organic properties of their base constituents, and has for its object a process of cooking-dehydration and of sterilization-dessication of organic wastes adapted to this end.

The invention also has for its object an apparatus for carrying out this process.

At present, the treatment of such by-products, is generally effected, particularly in the slaughterhouse industry, by means of cookers which operate discontinuously or continuously without added water. These cookers have form of chambers externally heated by steam or by means of any other heat transfer fluid flowing through a double shell. Thus, said heat transfer fluid transmits it calorific energy to the chamber, which heats the particles of product in contact with its wall, and, gradually, by thermal conduction all the particles of the product up to the middle thereof.

This known process, however, has major drawbacks, not only from an economic standpoint but also from that of the final quality of the obtained powder.

Thus, the heat transfer capacity of the chamber is limited by the coefficients of conduction of the liquids in contact with it and by the coefficient of conduction of the wall of the chamber, which are defined in practice by a mean transfer coefficient K, which varies as a function of the nature of the fluids and of the walls, over a wide range.

The effect of limitation of conductivity of the walls is partially corrected, in practice, by an artificial increase of the wall surface, by the provision of fins or the like. However, the conductive properties of the product, which decrease sharply with loss of water, cannot be changed, whereby the dehydration cycle is progressively extended if one wishes to obtain a thoroughly dehydrated powder.

Moreover, the heat transfer at the interior of the chamber, from particle to particle of product, results in the establishment of a temperature gradient, between the wall and the interior of the product, which is the greater as the dryness of the product increases. The particles located near the walls will accordingly be much hotter than necessary for their cooking or dehydration to ensure the transmission of heat to the particles at the interior of the product. There results an encrustation of the less greasy products on the walls, which again decreases the coefficient K.

For thermosensitive products such as organic wastes, this overheating has a serious drawback, namely, a degradation of the amino content of the components, which in fact comprises the market value of the powder.

It has been attempted to overcome this drawback by lowering the thermal gradient by provision of a mechanical agitator generally provided with a heating rotor, and disposed in the interior of the chamber. However, such an agitator is very cumbersome and permits only small improvement of the gradient.

The present invention has for its object to overcome the drawbacks of the known processes and apparatus.

Thus it has for its object a process of cooking-dehydration and sterilization-drying of organic wastes, characterized in that it consists principally in providing heat transfer by convection in free spaces in the interior of the product, by directly conducting heat-transfer fluid at high temperature into the mass of the product by means of diffusion nozzles immersed, therein.

The heat-transfer fluid which is used is combustion gases from a firebox heated with fuel or with gas or by other combustible material.

Any other heat-transfer fluid may be used to the extent that it is sufficiently inert.

The cooled gases and the exhaust gases are drawn from the top of the chamber through a cyclone and directed toward the firebox where they serve as carburation gas for the combustible material, whereby the malodorous components are desirably distroyed.

Fresh air is simultaneously introduced into the firebox, and the combined gaseous flux thus regenerated and reheated is directed toward the chamber for another cycle.

Excess flow is directed to a heat exchanger, where it gives up its available heat to the fresh air of regeneration, and is then evacuated by a chimney.

The ratio between the recycled gas flow and the total flow is adjustable as a function of the product to be treated.

A thermal probe disposed in the outlet conduit of the exhaust gases permits adjusting the temperature of the firebox according to calorific need, and a probe disposed at the outlet of the firebox permits adjusting the maximum temperature as a function of the thermal sensitivity of the product to be treated.

A rotatable stirrer disposed in the interior of the chamber ensures homogeneity of the gas-product mixture and renders optimum the diffusion of the gas through the product.

The invention will be better understood by the following description, which relates to preferred embodiments, given by way of non-limiting examples, and explained with reference to the accompanying schematic drawings, in which:

FIG. 3 is a view like that of FIG. 1 of apparatus operating continuously, and

FIG. 4 is a top plan view of the apparatus of FIG. 3.

Figure 1:
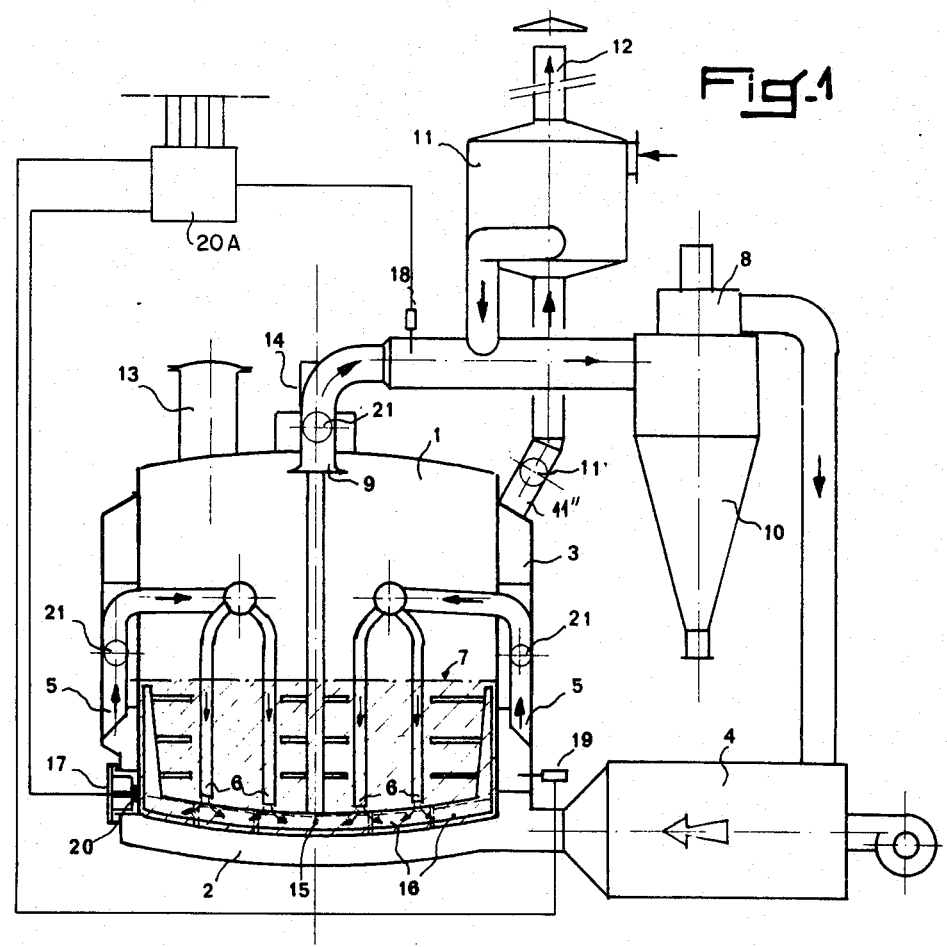
FIG. 1 is an elevational and cross-sectional view of apparatus according to the invention, operating batchwise.
Figure 2:
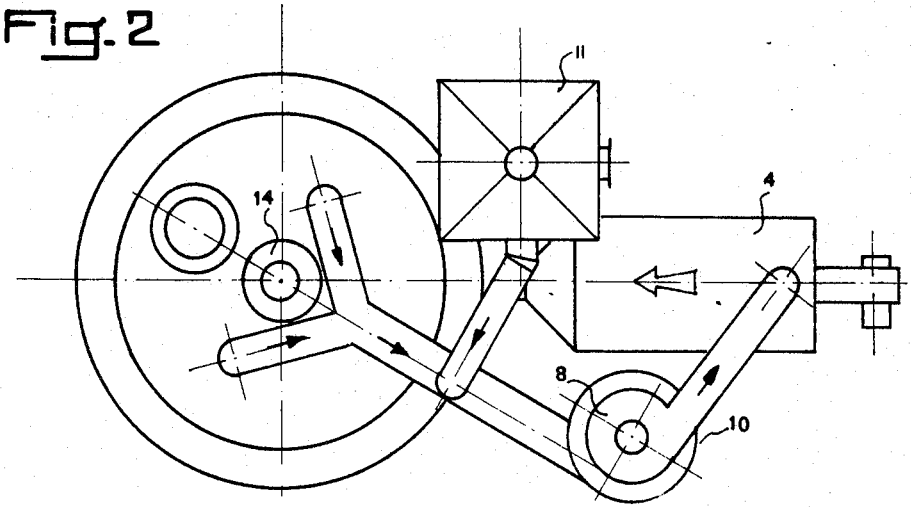
FIG. 2 is a top plan view of the apparatus of FIG. 1.

According to the invention, and as shown more particularly, by way of example, in FIGS. 1 and 2 of the accompanying drawings, the apparatus for the cooking-dehydration and sterilization-drying of organic wastes, is essentially constituted by a vertical cylindrical chamber 1 provided with a double wall forming a chamber 2 connected to a firebox 4 for liquid or gaseous combustibles. In chamber 2, the hot gases issuing from firebox 4 circulate in firetubes 3, in the lower portions of which open the conduits 5 for conducting these hot gases to diffusion nozzles 6, which are immersed in the products 7 contained in the chamber 1. The upper part of the latter is provided with an outlet suction conduit 9 for exhaust gases, which is connected to a cyclone 10 provided with a ventilator 8. The latter draws said exhaust gases, makes them pass through cyclone 10 and returns them to the firebox 4. This ventilator 8 simultaneously draws fresh air through a heat exchanger 11, whose heat source is constituted by a portion of the combustion gases, which are discharged from the firetubes 3 through a control valve 11' and a conduit 11'' connected to the inlet of exchanger 11, then through a chimney 12.

The control valve 11' permits proportioning the flow of evacuated gases, and thus determines the recycle ratio of the gaseous flow, which is reintroduced into enclosure 2 from which it externally heats the chamber 1 before being directed through conduits 5 toward the nozzles 6 which inject it into the product 7 to be treated.

This product 7 is introduced into the chamber 1 through a charging dome 13, and, during the process of cooking-dehydration, it is continuously mixed with hot gases issuing from nozzles 6 by means of a rotatable stirrer 15, driven by motor reducer assembly 14, and which is provided with spiral shovels 16. By reversal of the direction of rotation of stirrer 15, it is possible to effect evacuation of the product at the end of the cycle through a door 17.

The apparatus according to the invention is provided, moreover, with thermal probes 18 and 19 disposed respectively in suction conduit 9 for the exhaust gases and in enclosure 2 at the outlet of firebox 4 permitting adjustment of temperature, and a hygrometric probe 20 measuring the degree of dryness of the product, and disposed preferably on the door 17. These probes connected to a control box 20a permit entirely automatic operation of the process apart from the charging and discharging operations.

For carrying out special treatment, such as physical hydrolysis, for example, there may be provided isolation valves 21 in conduits 9 and 5, permitting temporary pressurizing of chamber 1.

FIGS. 3 and 4 show a modification of the apparatus according to the invention, operating continuously, especially adapted for the treatment of liquid products such as blood, or aqueous products containing no large solid particles.

In this embodiment, the suction conduit 9 is extended by a moveable concentric skirt 22 emptying into the upper region of fluidization of the product and adjustable as to height by means of a jack control device 23, or the like, disposed externally of conduit 9, and the powder is recovered in cyclone 10, which may be duplicated, if desired, as a function of the fineness of the particles by a final cyclone 24, a conveyor screw 25 ensuring its evacuation toward a storage bin (not shown), and the charging dome 13 may be provided with an airlock 26 when treating aqueous products or it can be replaced by a conduit having a valve for the treatment of liquid products.

Thus, for a given thermal power, provided by firebox 4, the adjustment of the speed of rotation of the airlock 26, or of the valve, determines the production flow rate or the dryness of the powder.

Thanks to the process and apparatus according to the invention, it is possible to heat the product principally by convection more than by conduction, the heat transfer fluid being conducted directly into the mass of the product to which it transmits, instantaneously and without any intermediary, its heat. Thus, the troublesome effects of the K factor and of the thermal gradient are avoided and the apparatus for carrying out the process is of less burdensome construction.

Moreover, thanks to the physical principle used for instantaneous drying, the temperature of the heat transfer fluid may be substantially higher leading to a substantial increase of thermal output of the apparatus.

Each particle of product withdrawing directly from the fluid only the heat energy which is needs for its cooking or its dehydration, a comparison of the outlet temperature of the exhaust gases and the vaporization temperature is sufficient to adjust instantaneously the energy load to be supplied.

The specific evaporation, which characterizes the efficiency of an installation for yielding water, either in the form of moisture, or in the form of water of combustion, is thus practically doubled and permits a substantial improvement of energy consumption relative to existing installations.

Finally, the increase in the specific coefficient of heat transfer of the gaseous mass resulting from the recycled flow renders possible transmission at equal flow rate, of a larger quantity of heat, and thus an increase of the productivity of the installation. Moreover, a substantial improvement is effected as to heat loses thanks to the gases that are recycled and not vented through the chimney, resulting in a saving of fuel consumption.

The invention has been described more particularly with regard to the treatment of organic wastes, but is equally applicable to other biodegradable products such as urban wastes, or the like, as well as to the drying of aqueous or liquid food products, whose preservation thus is ensured, and whose volume will be substantially reduced permitting a corresponding saving in the costs of transportation and storage.

Of course, the invention is not limited to the embodiments described and shown in the accompanying drawings. Modifications remain possible, particularly with respect to the construction of the various elements, or by substitution of technical equivalents without thereby departing from the scope of protection of the invention.

I claim:

1. Apparatus for cooking-dehydration and sterilization-drying of organic wastes, comprising a chamber (1) with double walls forming an enclosure (2) comprising fire tubes (3) that surround said chamber and that empty into conduits (5) connected to diffusion nozzles (6) immersed in a mass of product (7) trained in the chamber (1), a firebox (4) having an outlet connected to the enclosure (2) for supplying hot gases to the enclosure (2) and to said fire tubes (3) of the enclosure (2), a cyclone (10) having an exhaust gas ventilator (8) connected to the chamber (1) and to said firebox (4) so as to withdraw gases from within the chamber (1) and pass a portion of said gases through the cyclone (10) and then back to the firebox (4) for combustion of said gases, an indirect ambient air heat exchanger (11) connected to said fire tubes (3) and to said ventilator (8) so that said ventilator (8) draws fresh ambient air through said heat exchanger (11) in indirect heat exchange with said hot gases from said fire tube (3) in order to preheat said fresh air and said ventilator passes said preheated fresh air to said firebox (4) in admixture with said combusted gases from said chamber (1).

2. Apparatus according to claim 1, and further including control means for varying the amount of hot gas which passes from said fire tubes (3) to said heat exchanger (11).

3. Apparatus according to claim 1, wherein said cyclone (10) is connected to said enclosure (2) by a conduit (9) and further including thermal probes (18, 19) disposed respectively in said conduit (9) and in said enclosure (2) at the outlet of the firebox (4), a removable door (17) positioned and arranged on the chamber (1) for emptying the product (7) from said chamber (1), a hygrometric probe (20) for measuring the degree of dryness of the product (7) disposed on said door (17), and an automatic control box (20a) for automatically controlling the operation of the apparatus connected to said probes (18, 19).

4. Apparatus according to claim 1, and further including means (21) to vary the amount of gas that can be withdrawn from the chamber (1) thereby to control the pressure in the chamber (1).

5. Apparatus according to claim 1, and further including a rotatable stirrer (15) immersed in the product (7) in the chamber (1).

6. Apparatus according to claim 5, and further including spiral shovels (16) on said stirrer (15).

7. Apparatus according to claim 1, and further including motor-reducer assembly (14) connected to said stirrer (15) for rotating said stirrer (15).

* * * * *